United States Patent
Yang et al.

(10) Patent No.: US 7,646,894 B2
(45) Date of Patent: Jan. 12, 2010

(54) BAYESIAN COMPETITIVE MODEL INTEGRATED WITH A GENERATIVE CLASSIFIER FOR UNSPECIFIC PERSON VERIFICATION

(75) Inventors: Qiong Yang, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 758 days.

(21) Appl. No.: 11/276,112

(22) Filed: Feb. 14, 2006

(65) Prior Publication Data
US 2007/0189611 A1    Aug. 16, 2007

(51) Int. Cl.
G06K 9/62 (2006.01)
G06Y 7/00 (2006.01)
G06K 9/00 (2006.01)

(52) U.S. Cl. ............... 382/115; 382/225; 340/5.53; 340/5.83

(58) Field of Classification Search ............ 382/115, 382/225; 340/5.53, 5.83
See application file for complete search history.

(56) References Cited

U.S. PATENT DOCUMENTS

| | | | | |
|---|---|---|---|---|
| 5,572,597 | A * | 11/1996 | Chang et al. | 382/125 |
| 7,039,239 | B2 * | 5/2006 | Loui et al. | 382/225 |
| 7,242,810 | B2 * | 7/2007 | Chang | 382/227 |
| 7,508,979 | B2 * | 3/2009 | Comaniciu et al. | 382/154 |
| 2001/0020946 | A1 * | 9/2001 | Kawakami et al. | 345/582 |
| 2002/0114495 | A1 * | 8/2002 | Chen et al. | 382/117 |
| 2003/0021448 | A1 * | 1/2003 | Chen et al. | 382/117 |
| 2003/0048950 | A1 * | 3/2003 | Savakis et al. | 382/225 |
| 2005/0129288 | A1 * | 6/2005 | Chen et al. | 382/118 |
| 2005/0265607 | A1 * | 12/2005 | Chang | 382/224 |
| 2006/0184482 | A1 * | 8/2006 | Flinn et al. | 706/45 |
| 2006/0193494 | A1 * | 8/2006 | Toyama | 382/103 |
| 2006/0206313 | A1 * | 9/2006 | Xu et al. | 704/10 |

* cited by examiner

*Primary Examiner*—Bhavesh M Mehta
*Assistant Examiner*—Kathleen S Yuan
(74) *Attorney, Agent, or Firm*—Lee & Hayes, PLLC

(57) ABSTRACT

A Bayesian competitive model integrated with a generative classifier for unspecific person verification is described. In one aspect, a competitive measure for verification of an unspecific person is calculated using a discriminative classifier. The discriminative classifier is based on a Bayesian competitive model that is adaptable to unknown new classes. The Bayesian competitive model is integrated with a generative verification in view of a set of confidence criteria to make a decision regarding verification of the unspecific person.

17 Claims, 7 Drawing Sheets

BAYESIAN COMPETITIVE MODEL INTEGRATED WITH A GENERATIVE CLASSIFIER FOR UNSPECIFIC PERSON VERIFICATION

BACKGROUND

In the past decade, high-security verification based on face analysis has been an important research topic in computer vision and human-machine interaction. There are two types of verification protocols: specific person verification protocols and unspecific person verification protocols. Specific person verification involves verification of specific person, where a population of clients is fixed. Both the adopted representation (features) and the verification algorithms applied in the feature space are based on some training data collected for the client set. Thus, the system design is tuned to the specific client set. In contrast to specific person verification, unspecific person verification is verification of an unspecific person, where the client set is unknown and no samples of the client can be used during the designing stage. In such scenarios, the feature space and the system parameters are trained by subjects that are completely independent from that used for specifying client models.

Past research efforts have mainly focused on the verification of specific clients, not unspecific persons. However in recent years, there is a growing interest in finding a robust and portable (e.g., use the same feature space and the same design parameters (e.g. thresholds)) solution for unspecific person verification. Such a system would be useful in many scenarios. For example, a system for unspecific person verification would be useful in an airport where passengers show their ID cards and the photos on the cards are compared with the on-site video to verify their identities. Another example scenario that would benefit from unspecific person verification is when an existing verification system used on a first group of clients is to be used for a different group of clients.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, a Bayesian competitive model integrated with a generative classifier for unspecific person verification is described. In one aspect, a competitive measure for verification of an unspecific person is calculated using a discriminative classifier. The discriminative classifier is based on a Bayesian competitive model that is adaptable to unknown new classes. The Bayesian competitive model is integrated with a generative verification in view of a set of confidence criteria to make a decision regarding verification of the unspecific person.

BRIEF DESCRIPTION OF THE DRAWINGS

In the Figures, the left-most digit of a component reference number identifies the particular Figure in which the component first appears.

DETAILED DESCRIPTION

Overview

Systems and methods for a Bayesian competitive model and its integration with generative classifier for unspecific person verification are described. These systems and methods are based on a determination that a discriminative classifier that is adaptable to an unknown new class can be designed for the unspecific person verification problem. Although the client set is unknown in the designing stage, persons out of the client set can be obtained, in many instances. By collecting face images of such persons, a large common library can be generated with a population that is independent from the client set. This is a client-independence assumption of the common library. Competitive prototypes are constructed to partially infer the complex non-client class by using the common library In view of this partial inference, the systems and methods design a discriminative classifier to reduce false acceptance error. Additionally, even though the client is unknown, the systems and methods infer intra-class variation of the client from those of numerous known persons in the common library, given the assumption that variations of different persons under a same varying mode are similar. This is referred to as an across-person propagation assumption. In this way, the systems and methods design and utilize an adaptable discriminative classifier (called Bayesian competitive model) for verification of unspecific persons. Additionally, recognizing that generative classifiers and discriminative classifiers have complementary strengths in controlling error rates, the systems and methods integrate the Bayesian competitive model with a generative classifier in view of confidence to further improve the unspecific person verification decisions.

We now describe these and other aspects for a Bayesian competitive model and its integration with similarity verification for unspecific person verification in greater detail.

An Exemplary System

Although not required, the systems and methods for integrating Bayesian competitive model for unspecific person verification are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
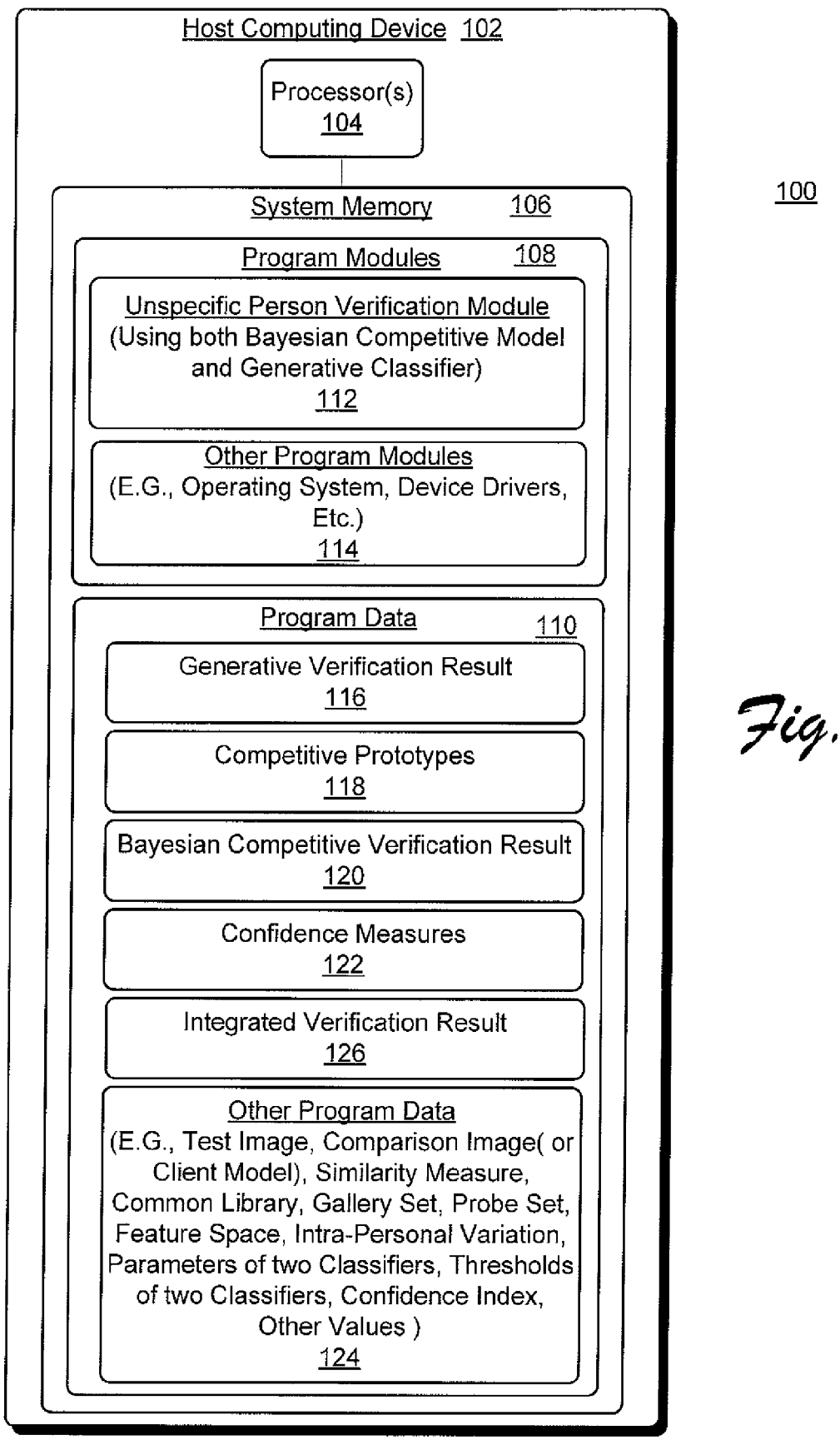
FIG. 1 illustrates an exemplary system for an integrated verification system for unspecific person verification, according to one embodiment. The system is integrated because it integrates a Bayesian competitive model with a generative classifier for unspecific person verification.

FIG. 1 illustrates an exemplary system 100 for an integrated verification system for unspecific person verification, according to one embodiment. The system is integrated because it integrates a Bayesian competitive model with a generative classifier for unspecific person verification. System 100 includes host computing device 102. Host computing device 102 represents any type of computing device such as a personal computer, a laptop, a server (e.g., in a server/client computing environment), handheld or mobile computing device, etc. Host computing device 102 includes one or more processing units 104 coupled across a bus 103 to system memory 106. System memory 106 includes computer-program modules ("program modules") 108 and program data 110. A processor 104 fetches and executes computer-program instructions from respective ones of the program modules 108. Program modules 108 include unspecific person verification module 112, and other program modules 114 such as an operating system, device drivers, etc.

Unspecific person verification module 112 includes a Bayesian competitive model and a generative classifier, both of which are adaptable to an unknown new class for verifying a claim by someone (the claimant) that he is a particular person (the claimed client, not known during the designing stage). To this end, unspecific person verification module 112 uses a test image (from the claimant), a comparison image (from the claimed particular person), and a collection of images from a common library of images to determine if the claimant is the particular person. In one implementation, for example, the test image is taken (using a digital camera, etc.) during the verification process, at a time relatively proximate to the process, or in some other manner that substantially guarantees authenticity of the test image. The comparison image represents an image of someone that the claimant is asserting to be. In one implementation, for example, the comparison image is from a passport or some other official document, retrieved from a data source such as an image gallery, etc. The collection of images in the common library represents images of persons that are independent of the client. Images in common library contain variations in pose, illumination, expression, age, size, adornments, etc.

To determine whether the claimant is the person represented in the comparison image, unspecific person verification module 112 implements a class unspecific discriminative classifier (a Bayesian competitive model) to give the probability of being from the same person. Such a probability is shown as Bayesian competitive verification result 120. Additionally, unspecific person verification module ("verification module") 112 integrates the result from the Bayesian competitive verification result 120 with results of generative verification operations (generative verification result 116) based on confidence measures 122 to obtain a more reliable verification result (shown as integrated verification result 126). The Bayesian verification is described in the section titled "Bayesian Competitive Model" with respect to equations (1) and (2), which are described below. The generative classifier and the integration are described below in the section titled "Integration".

The reason for integration is that both discriminative classifier and generative classifier have their respective strengths and weaknesses. The verification module 112 calculates respective confidence measures 122 in view of an accuracy rate on the validation set to determine the reliability of each classifier. Verification module 112 evaluates the respective confidence measures 122 to determine how to combine the verification results from two classifiers.

In view of the above, if verification module 112 determines that the test image is similar to the comparison image and dissimilar to any image in the common library, verification module 112 specifies that the claimant is who the claimant asserts to be. However, if verification module 112 determines that the test image is dissimilar to comparison image and much similar to image(s) in the common library, verification module 112 indicates that the claimant is not the person the claimant asserts to be. When the test image is dissimilar (or similar) to both comparison image and the image(s) in the common library, verification module 112 determines if similarity between the test image and comparison image is higher than some threshold. If this is the case, verification module 112 indicates that the claimant is who he asserts to be, or vice versa.

We now describe specifics of the unspecific person problem formulation, the Bayesian competitive model including Bayesian two-class and multiple-class verification operations and algorithms, generation of the competitive prototypes, across-person density propagation operations, and confidence-based integration for unspecific person verification decision-making in greater detail.

Problem Formulation

Suppose a client (an unspecific person) is denoted as C, and $x_C$ represents the face of the client. For a test face $x_T$ which claims its identity to be C, the task of verification can be defined to decide if C=T exists, where T is the true identity of $x_T$. This decision is generally made by the decision function $h_\theta(x_T,C)$, where $\theta$ is the parameter set of $h_\theta(\cdot)$. If $h_\theta(x_T,C)$>th where th is a predefined threshold, $x_T$ is accepted as the true client; otherwise, it is rejected as an imposter. This will produce two types of errors: false acceptance (FA) if $x_T$ is accepted when C≠T, and false rejection (FR) if it is rejected when C=T. Then, the performance is evaluated by the percentage of these two errors: false acceptance rate and false rejection rate.

Design and Evaluation

To design and evaluate operations of unspecific person verification module 112, data is divided into four sets: a training set T, a validation set V, a gallery set G, and a probe set P. Only T and V are used in the system design stage. T is used to find an appropriate feature space and design classifier parameters in the feature space; V is used to adjust the parameters for better generalization; G is used to build the client model; P is for the performance evaluation.

For the verification of specific person, there is C ∈ $S_T$ and C ∈ $S_V$, where $S_T$ and $S_V$ are the subjects in T and V respectively. Therefore, both $h_\theta(x_T,C)$ and th are dependent on C. While in unspecific person verification, there is C ∉ $S_T$ and C ∉ $S_V$, so both $h_\theta(x_T,C)$ and th are expected to be independent of C. However, since C is unknown in the designing stage, samples of clients (for training) are not available. As a result, it is difficult to learn the distribution of C. Additionally, it is even more difficult to learn the distribution of the 'non-client' class $\bar{C}$, which covers all subjects outside C. Despite these limited conditions, the class-unspecific Bayesian classifier 120 implemented by the verification model 112 is designed by training and adapting system 100, as follows.

Figure 2:
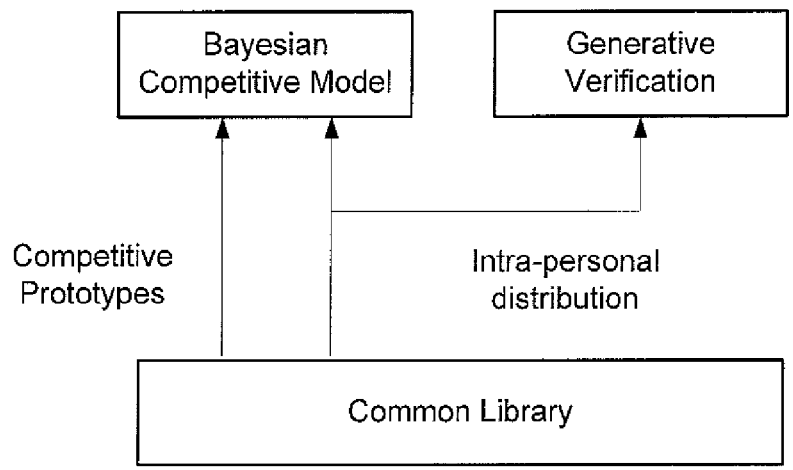
FIG. 2 shows exemplary block diagram illustrating training aspects for the Bayesian competitive model and generative verification, according to one embodiment.
Figure 3:
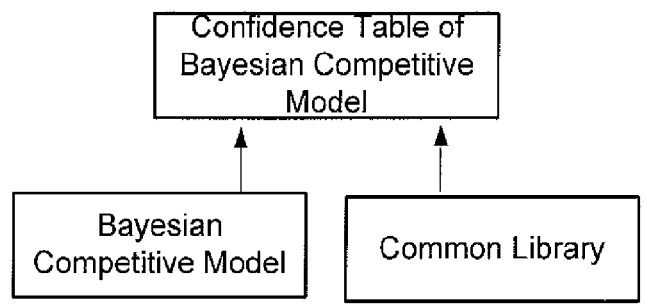
FIG. 3 shows exemplary block diagram illustrating validation aspects for the Bayesian competitive model, according to one embodiment, which are used to compute the confidence of Bayesian competitive model.
Figure 4:
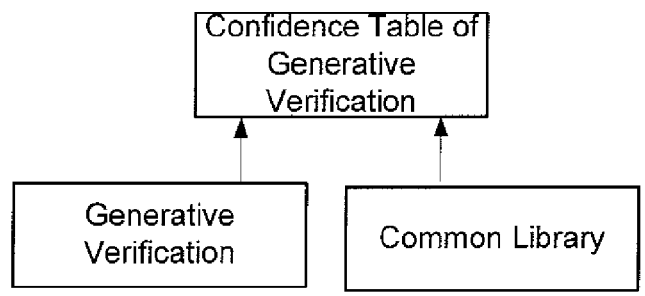
FIG. 4 shows exemplary block diagram illustrating validation aspects for the generative verification, according to one embodiment. These validation aspects are used to compute the confidence of generative verification.

Training and designing of system 100 involves two stages: training using the training set, and adaptation using the validation set. The training set is used to find an appropriate feature space and design classifiers in the feature space (such a feature space is shown as a respective portion of "other program data" 124). The validation set is used to compute the confidence tables 122 of both Bayesian competitive model and generative verification. FIG. 2 shows an exemplary block diagram illustrating training aspects for the Bayesian competitive model and generative verification, according to one embodiment. FIG. 3 shows an exemplary block diagram illustrating validation aspects for the Bayesian competitive model, according to one embodiment. FIG. 4 shows an exemplary block diagram illustrating validation aspects for the generative verification, according to one embodiment.

Figure 5:
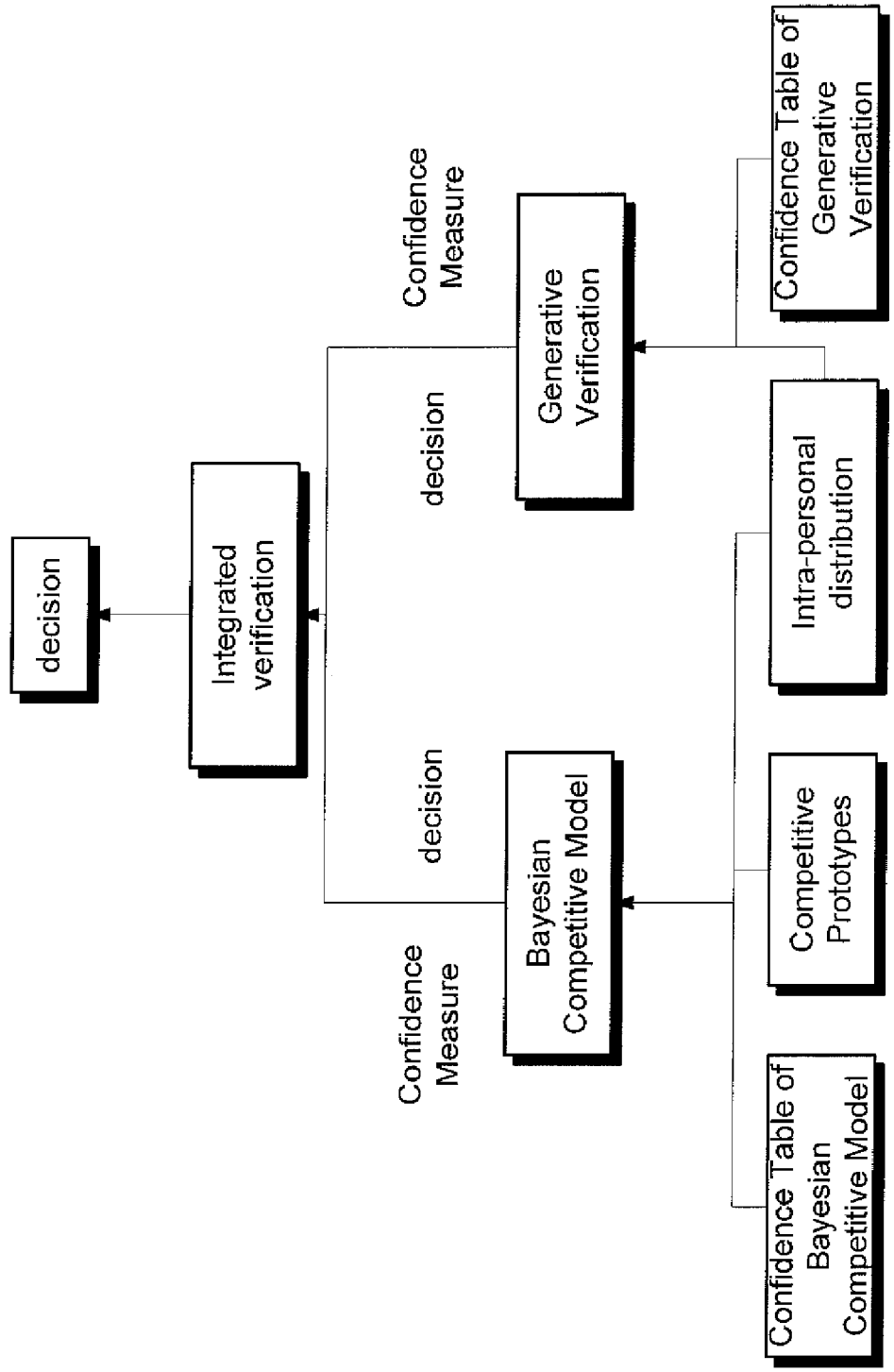
FIG. 5 shows an exemplary block diagram illustrating aspects of using the integrated verification system, according to one embodiment

Evaluation of system 100 involves two stages: building client model and testing. The gallery set is used to build a client model (a respective portion of "other program data" 124), which tells system 100 what the client looks like. Then a probe set (i.e. test set) is used to evaluate the performance of system 100. A person in the probe set may be included in the client set or may not be included, but the person always claims to be some client in the client set. The system is designed to judge if the claim is correct or not. For the person who is the claimed client, the system is expected to accept the claim. For the person who is not the claimed client, the system is expected to deny the claim. By comparing verification decisions made by system 100 against expected verification decisions, the performance of system 100 is evaluated accordingly. FIG. 5 shows an exemplary block diagram illustrating aspects of using the integrated verification system, according to one embodiment.

In this implementation, common library is utilized as both a training set and a validation set. The common library (as the training set) is used to learn the intra-personal variation $p_{\Delta x}$ ($\Delta x | \Omega_1$), and the competitive prototypes 118 (i.e., $x_{CNS_i}$(i=1, 2, . . . ,m)). The competitive prototypes 118 are the training results on the common library, which are similar to some representative templates of the persons in the non-client class. Using the common library as the validation set, confidence of both the Bayesian competitive verification result 120 and generative verification result 116 are measured (such measurements are shown as confidence measures 122).

Bayesian Competitive Model

Bayesian verification is first discussed to demonstrate its advantage over generative verification under the case of complete data. Then the Bayesian Competitive Model (BCM) is presented to apply Bayesian decisions for unspecific person verification problem with the client-independence assumption, where only incomplete data is available; this assumption is then relaxed in the general case.

Bayesian Verification

Two-class Problem: Suppose that $\overline{C}$ has only one class, and both C and $\overline{C}$ are known with enough data for the estimation of $p_x(x|C)$, $p_x(x|\overline{C})$, $P(C)$ and $P(\overline{C})$, where the former two are the likelihood functions of C and $\overline{C}$, and the latter two are their prior probabilities respectively. The Bayesian verification decision can be illustrated as follows. Accept $x_T$ as C if $p_x(C|x_T) > p_x(\overline{C}|x_T)$, otherwise reject $x_T$ as the imposter, where $p_x(C|x_T)$ and $p_x(\overline{C}|x_T)$ are the posterior probability density functions of $x_T$ belonging to C and $\overline{C}$ respectively. This can be equivalently reformulated into a decision whether $$h_\theta(x_T, C) = \frac{p_x(x_T|C)P(C)}{p_x(x_T|\overline{C})P(\overline{C})} > 1. \quad (1)$$

By using the Bayesian rule as in Eq.(1), the threshold on the right hand is independent of C. This indicates that we need not change the threshold as the client changes, and the system is adaptive to unknown clients. This is very relevant for the verification of unspecific person.

Multiple-class Problem: If $\overline{C}$ contains multiple classes, i.e. $\overline{C}=\{NC_i, i=1,2, \ldots ,m\}$, (m>1), according to the Bayesian rule we get the following. Accept $$x_T \text{ if } p_x(C|x_T) > \max_{i=1,2,L,m} p_x(NC_i|x_T), \text{ otherwise reject } x_T.$$

This can be reformulated into a decision whether $$h_\theta(x_T, C) = \frac{p_x(C|x_T)}{\max_{i=1,2,L,m} p_x(NC_i|x_T)} > 1, \quad (2)$$

which is equivalent to the following:

$$h_\theta(x_T, C) = \frac{p_x(x_T|C)P(C)}{\max_{i=1,2,L,m} \{p_x(x_T|NC_i)P(NC_i)\}} > 1. \quad (3)$$

Figure 6:
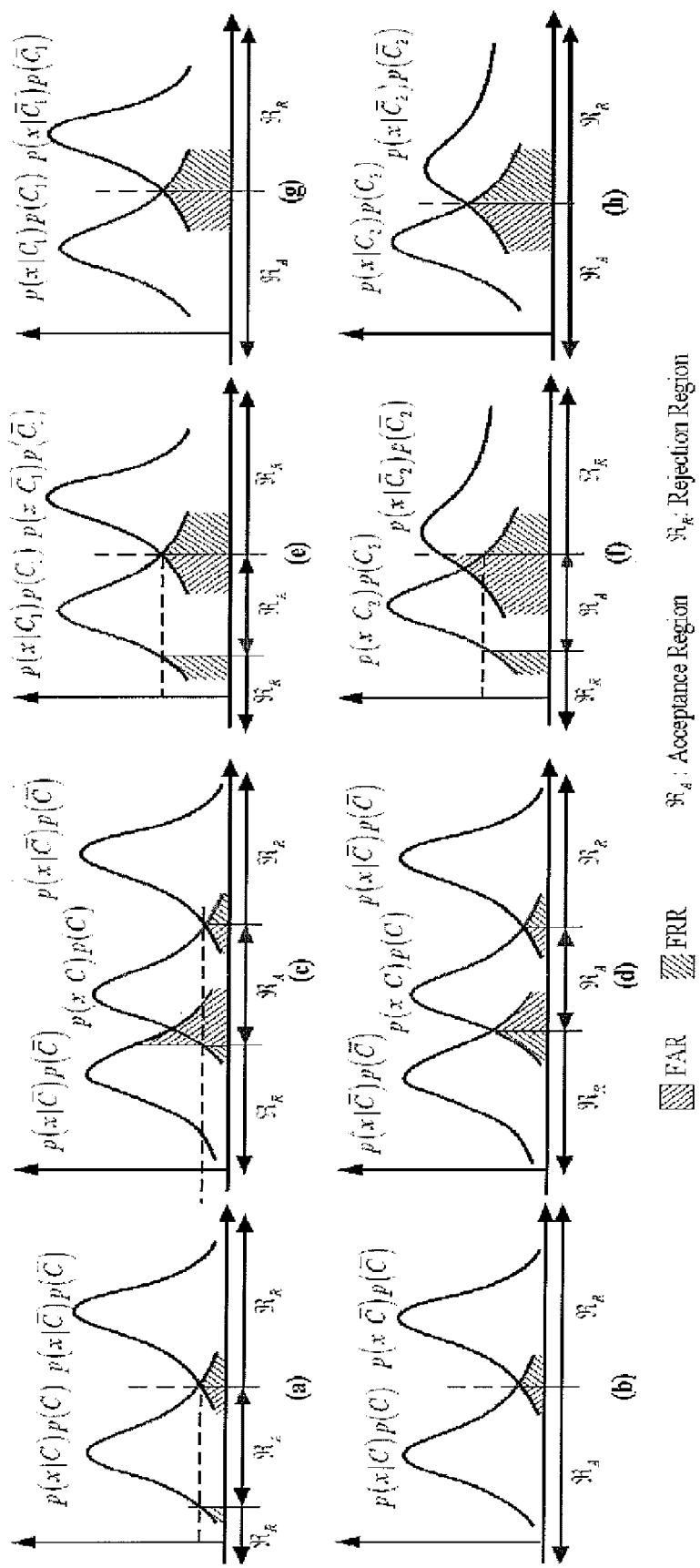
FIG. 6 shows an exemplary comparison of using a Bayesian classifier for unspecific person verification as compared to using a generative classifier for unspecific person verification.

FIG. 6 shows an exemplary comparison of using a Bayesian classifier for unspecific person verification as compared to using a generative classifier for unspecific person verification. Comparison in case of single-person verification with one-side distribution FIGS. 6(a) and (b) and asymmetric two-side distribution FIGS. 6(c) and (d). FIGS. 6(a) and 6(c) show classification errors of generative classifier. FIGS. 6(b) and 6(d) are those of Bayesian classifier. With respect to FIGS. 6(e) through 6(h): Comparison in case of multiple-person verification. With respect to (e through f), these represent classification errors of generative classifier when the client is changing from $C_1$ to $C_2$. With respect to (g through h), these represent a Bayesian classifier in the same case as (e through f).

Compared with generative verification whose decision function is $h_\theta(x_T,C)=p_x(x_T|C)P(C)$, Bayesian verification is superior under the case of complete data. FIG. 6 displays three cases to show this advantage. In the first case (FIG. 6(a) through 6(b)), generative verification has higher false rejection rate than Bayesian verification under the same false acceptance rate. In the second case (FIGS. 2(c) and (d)), where the samples of $\overline{C}$ are distributed on two sides of that of C asymmetrically, it is difficult for the generative verification to design an optimal threshold for both sides, while Bayesian verification can be used to design such a threshold. In the third case (FIG. 2(e) through (h)), where $p_x(x|C)P(C)$ and $p_x(x|\overline{C})P(\overline{C})$ are varying when the client changes, it is difficult for the generative verification to design an appropriate global threshold for all clients. The threshold fit for one client may be unfit for another. While in Bayesian verification, the threshold is independent of the client, so we need not change the threshold as the client changes.

Competitive Prototype

To apply Bayesian verification in unspecific person verification, the first task is to determine how to describe $p_x(x|\bar{C})$, and the second task is the inference of $p_x(x|C)$. To describe $p_x(x|\bar{C})$, we build up a large common library L (common library) by collecting images of a large number of persons. These images contain variations in pose, illumination, expression, age, size, glasses and etc. Unspecific person verification module 112 implements automatic operations to detect and preprocess faces. Each facial region is partitioned into components including, for example, eyes, nose, and mouth. Gabor (Holistic, or other) features are then extracted with respect to these components. The extracted features are then compressed using well-known Principal Component Analysis (PCA) techniques.

Given the assumption that the population of the common library is independent from the client set, the distribution of the 'non-client' class for each client can be partially inferred to be independent of the client. In this implementation, because the common library is very complex, K-Means clustering or EM (Expectation-Maximization) is utilized.

K-Means Clustering and Max Rule: In this scheme, the 'non-client' class is determined to be a union of multiple sub-classes. In view of this, K-Means clustering is utilized to categorize the samples in one cluster into one sub-class, with the cluster centroid representing the mean of that sub-class. Suppose that there are m clusters represented by $CNS_i$ (i=1,2, ..., m), and their centroids are $x_{CNS_i}$ (i=1,2, ..., m). According to Bayesian rule (Eq.3), there is:

$$h_\theta(x_T, C) = \frac{p_x(x_T|C)P(C)}{\max_{i=1,2,L,m} \{p_x(x_T|CNS_i)P(CNS_i)\}}. \quad (4)$$

Here, $x_{CNS_i}$ are called competitive prototypes (please see FIG. 1, competitive prototypes 118). Since the competitive prototypes are combined by max rule, this scheme is called BCM-max.

EM Algorithm and Sum Rule: If it is determined to that the non-client class is a mixture of multiple sub-classes, according to Bayesian rule (Eq.1), there is:

$$h_\theta(x_T, C) = \frac{p_x(x_T|C)P(C)}{P(\bar{C})\sum_{i=1}^{m} \alpha_i p_x(x_T|CNS_i)}, \quad (5)$$

where $\alpha_i$ are the mixture coefficients. This can be learned by Expectation Maximization (EM) algorithm using the K-Means clustering as the initial:

$$\alpha_i = \frac{\sum_{x \in \bar{C}} P(x \in CNS_i)}{\sum_{i=1}^{m} \sum_{x \in \bar{C}} P(x \in CNS_i)}, \quad x_{CNS_i} = \frac{\sum_{x \in \bar{C}} xP(x \in CNS_i)}{\sum_{x \in \bar{C}} P(x \in CNS_i)}. \quad (6)$$

From Eq. (5), it is apparent that the competitive prototypes are combined by sum rule in view of this, this scheme is called BCM-sum.

Across-Person Density Propagation

To infer $p_x(x|C)$, a propagation scheme is utilized to make $h_\theta(x_T, C)$ adaptable to an unknown new client. To this end, $$\hat{p}_x(x_T|C) = p_{\Delta x}(\Delta x|\Omega_I)|_{\Delta x = x_T - x_C}$$

is used to propagate the distributions of numerous known persons to that of the client C. Here, $\Omega_I$ is the intra-personal variation and $p_{\Delta x}(\Delta x|\Omega_I)$ is its likelihood function. The basic assumption is that the variations of different persons under the same varying mode are similar. This can be demonstrated by FIGS. 7(a) and 7(b), where sample distributions of four persons are plotted under pose variation (the pose varies horizontally in FIG. 7(a), and vertically in FIG. 7(b)). It can be seen that the assumption fits well with the true data. Under this assumption, $\hat{\Sigma}_I$, which satisfies $\hat{\Sigma}_I = \Sigma_i P(S_i)\hat{\Sigma}_i$, is utilized to propagate the covariance matrices of numerous known persons to that of the unknown client (FIG. 2(c)). Here, $\hat{\Sigma}_I$ and $\hat{\Sigma}_i$ are ML (maximum-likelihood) estimations of the covariance matrices of $\Omega_I$ and person $S_i$ respectively, and $P(S_i)$ is the prior of $S_i$.

Figure 7:
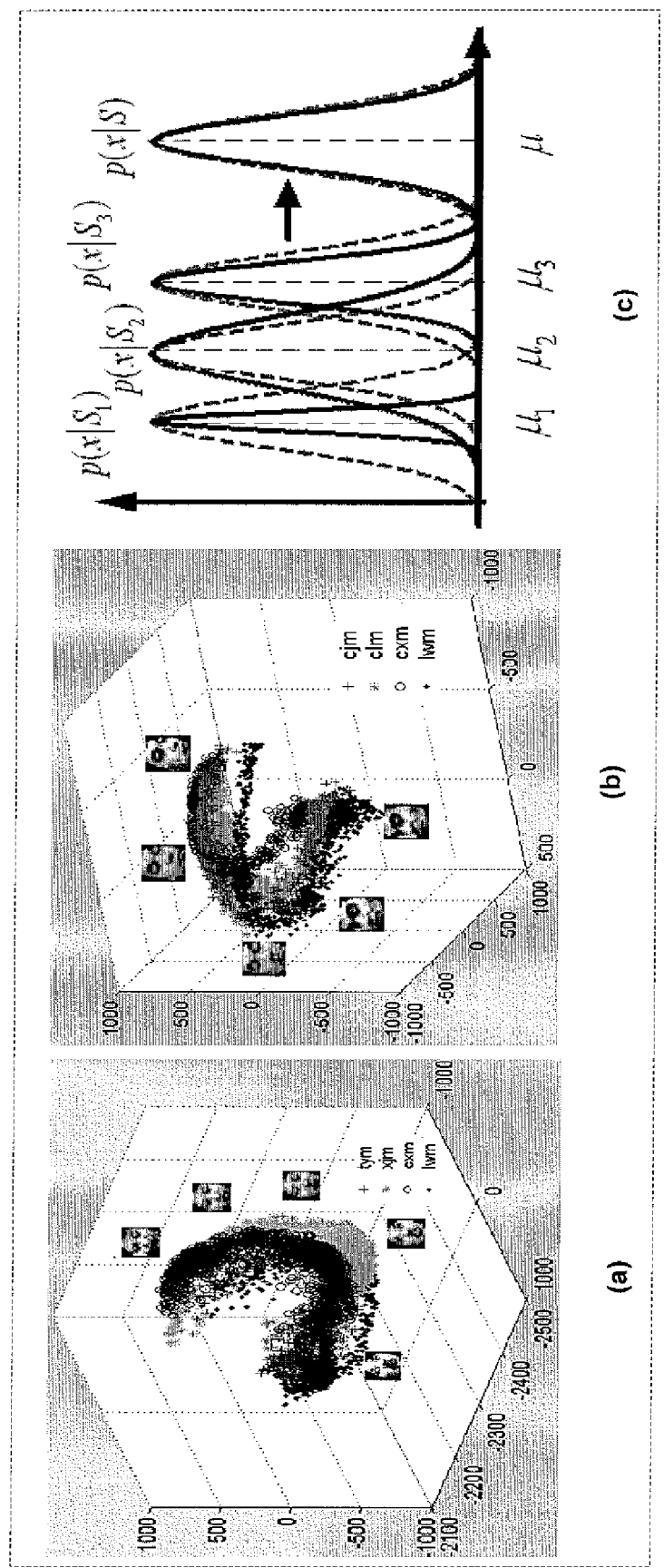
FIG. 7 shows exemplary across-person density propagation, according to one embodiment.

FIG. 7 shows exemplary across-person density propagation, according to one embodiment. As indicated above, across-person density propagation is used to infer distribution of a claimed client, since the claimed client is unknown. (Distributions of numerous known persons are used to infer that of the unknown person (i.e. the claimed client)). FIG. 7(a) shows exemplary distributions of various persons under the horizontal change of pose. FIG. 7(b) shows exemplary distributions of various persons under vertical change of pose. FIG. 7(c) shows exemplary density propagation from multiple known persons to the unknown new person. In 7(a) and 7(b), the distributions of the top 3 PCA features of four different persons are plotted when their poses vary horizontally (FIG. 7(a)) and vertically (FIG. 7(b)), and the key images during pose variation are also plotted alongside. In FIG. 7(c), three known persons are Gaussian distributed, which are supposed to have the same variance. The variance of the unknown (unspecific) person is estimated by the weighted average on the estimations from the three known persons. The dashed line and the solid line respectively denote the true and estimated distribution of each person.

It can be proved that there exist $$E\left(\left[\hat{\Sigma}_I\right]_{pq}\right) = E\left(\left[\hat{\Sigma}_i\right]_{pq}\right), \operatorname{var}\left(\left[\hat{\Sigma}_I\right]_{pq}\right) \quad (7)$$

$$= \frac{M_i}{M} \operatorname{var}\left(\left[\hat{\Sigma}_i\right]_{pq}\right), \forall\, p, q$$

under the assumption that all samples are independently identically distributed. Here, $M_i$ is the number of samples from person $S_i$, and $M = \Sigma_i M_i$. p and q are the indices of matrix. Eq.(7) indicates that $\hat{\Sigma}_I$ has the same expectation as $\hat{\Sigma}_i$, but less variance, and the larger M is, the less variance it has, leading to a more efficient estimation.

For more simplification, $$\hat{p}_x(x_T|CNS_i) = p_{\Delta x}(\Delta x|\Omega_I)|_{\Delta x = x_T - x_{CNS_i}}$$

is used as an approximation. In this way, only $x_{CNS_i}$, $\hat{\Sigma}_I$, and $P(CNS_i|\overline{C})$ (or $\alpha_i$) need to be trained for computing the following decision function:

(Sum-Rule) (8)
$$h_\theta(x_T, C) \approx \frac{P_{\Delta x}(\Delta x|\Omega_I)|_{\Delta x = x_T - x_C}}{\sum_{i=1}^{m} \alpha_i p_{\Delta x}(\Delta x|\Omega_I)|_{\Delta x = x_T - x_{CNS_i}}} > \frac{P(\overline{C})}{P(C)},$$

(Max-Rule) (9)
$$h_\theta(x_T, C) \approx \frac{P_{\Delta x}(\Delta x|\Omega_I)|_{\Delta x = x_T - x_C}}{\max_{i=1,2,L,m}\left\{P_{\Delta x}(\Delta x|\Omega_I)|_{\Delta x = x_T - x_{CNS_i}} P(CNS_i|\overline{C})\right\}} > \frac{P(\overline{C})}{P(C)}.$$

In the above formulas, $P(C)$ and $P(\overline{C})$ are placed to the right so they do not need to be estimated separately in designing the decision function. Rather, set the threshold by estimating their ratio. In this way, the designing process is flexible and convenient.

In practice, since there are only a small number of samples available for each subject, $p_{\Delta x}(\Delta x|\Omega_I)$ are computed as follows to reduce the effect of estimation error due to small-sample-size. Suppose $\hat{\Sigma}_I = \Phi \Lambda_I \Phi^T$, where $\Phi = [u_1, \ldots, u_N]$ and $\Lambda_I = \text{diag}(\lambda_1, \ldots, \lambda_N)$ are the eigenvector matrix and eigenvalue matrix of $\Omega_I$ respectively, and $y = [y_1, \ldots, y_N]^T = \Phi^T \Delta x$. Using the probabilistic distance, there is $$p_{\Delta x}(\Delta x|\Omega_I) = \left[\frac{\exp\left(-\frac{1}{2}\sum_{r=1}^{K}\frac{y_r^2}{\lambda_r}\right)}{(2\pi)^{\frac{K}{2}}\prod_{r=1}^{K}\lambda_r^{1/2}}\right]\left[\frac{\exp\left(-\frac{1}{2\rho}\sum_{r=K+1}^{N}y_r^2\right)}{(2\pi\rho)^{\frac{N-K}{2}}}\right], \quad (10)$$

where $$\rho = \frac{1}{N-K}\sum_{r=K+1}^{N}\lambda_r \text{ or } \rho = \lambda_{K+1}.$$

Assumption Relaxation

In the above, the Bayesian competitive model is derived under the client-independence assumption, which states that the population of the common library L is independent from the client set. Suppose $S_L$ is the subjects in L, and $S_C = \{C_j, j=1,2,L,n\}$ is the subjects in the client set. The assumption means $S_L \subseteq I_j \overline{C}_j$ to ensure that the partial inference of $p_x(x|\overline{C}_j)$ is independent of $C_j$, $\forall j$. This can be relaxed if the decision in Eq.(1) is formatted into $$h_\theta(x_T, C) = \frac{p_x(x_T|C)P(C)}{p_x(x_T)} > \frac{1}{2}, \quad (11)$$

where $$p_x(x_T) = p_x(x_T|C)P(C) + p_x(x_T|\overline{C})P(\overline{C})$$

is the distribution of the general face model. No matter whether $S_L$ contains clients, it is reasonable to use L to partially infer this general model $p_x(x_T)$. Therefore, the Bayesian competitive model is still applied using the decision function as Eq.(11).

Integration

Bayesian Verification vs. Generative Verification

The generative verification measure is denoted as $h_S(x,C)$ >th1, and Bayesian verification measure is denoted as $h_B(x, C)$>th2 in the following sections. In case of two-class problem, there is:

$$h_S(x, C) = p_x(x|C)P(C), \quad h_B(x, C) = \frac{p_x(x|C)P(C)}{p_x(x|\overline{C})P(\overline{C})}. \quad (12)$$

- When both C and $\overline{C}$ are known with enough data to estimate $p_x(x|C)P(C)$ and $p_x(x|\overline{C})P(\overline{C})$, Bayesian verification is optimal in classification error and better than generative verification as shown in FIG. 6.
- When $\overline{C}$ are totally unknown, it can be assumed that $\overline{C}$ is uniformly distributed, then Bayesian verification degrades to generative verification.
- Given $\overline{C}$ is partially known, $p_x(x|\overline{C})P(\overline{C})$ can be partially inferred. Generative verification is good at controlling false rejection rate, while Bayesian verification reduces false acceptance rate.

In view of the above, system 100 integrates these two types of classifiers to strengthen the unspecific person verification results.

Denote $L = h_S(x,C)>th1$ as the classifier of generative verification, and $R = h_B(x,C)>th2$ as that of Bayesian verification. The outputs of the two classifiers are:

$$\omega_S(x) = \begin{cases} 1, & \text{if } h_S(x, C) > th1 \\ 0, & \text{otherwise,} \end{cases}$$

$$\omega_B(x) = \begin{cases} 1, & \text{if } h_B(x, C) > th2 \\ 0, & \text{otherwise} \end{cases}$$

Denote the confidence of L and R as $F_S$ and $F_B$, and their corresponding mapping functions are $f_S: L a F_S$, $f_B: R a F_B$. In one implementation, the threshold th1 is computed to set $P(L<th1|x \in C) = \epsilon$ where $\epsilon = 2\%$.

The mapping functions are computed as:

$$f_S(L) = \frac{\sum_{k=0,1}\text{count}(\{x|x \in \Omega_k \ \& \ \omega_S(x) = \omega_k \ \& \ h_S(x, C) \in \mathcal{N}_L\})}{\sum_{k=0,1}\text{count}(\{x|x \in \Omega_k \ \& \ h_S(x, C) \in \mathcal{N}_L\})}, \quad (13)$$

$$f_B(R) = \frac{\sum_{k=0,1}\text{count}(\{x|x \in \Omega_k \ \& \ \omega_B(x) = \omega_k \ \& \ h_B(x, C) \in \mathcal{N}_R\})}{\sum_{k=0,1}\text{count}(\{x|x \in \Omega_k \ \& \ h_B(x, C) \in \mathcal{N}_R\})}, \quad (14)$$

where $\Omega_0 = \overline{C}$, $\Omega_1 = C$, $\omega_0 = 0$, $\omega_1 = 1$, $N_L = [L-\delta, L+\delta]$, $N_R = [R-\delta, R+\delta]$. $\delta$ is a small number which controls the size of neighborhood.

The decision strategy of the integrated classifier is:

$$\omega_F(x) = \begin{cases} \omega_S(x), & \text{if } f_S(h_S(x, C)) > f_B(h_B(x, C)) \\ \omega_B(x), & \text{otherwise,} \end{cases} \quad (15)$$

Accordingly, in one implementation, system 100 integrates a Bayesian competitive model with generative decision for the verification of unspecific persons. This competitive model reduces false acceptance rate by learning the non-client class represented by common library, and confidence-based integration enables system 100 to achieve good performance on both false acceptance rate and false rejection rate. (The generative classifier is used to control false rejection rate, and the discriminative one is used to reduce false acceptance rate). Additionally, system 100 is less independent of utilizing training samples of the client in the designing stage. This overcomes any limitation of client-specific verification and presents a new approach to improve performance for the verification of unspecific persons.

In view of the above, system 100 provides a class-unspecific discriminative classifier 120. Previously, the inference of the distribution of "non-client" class had been deemed rather difficult if not impossible since both the client and its corresponding "non-client" class are unknown. Therefore, conventional systems typically considered use of only a generative classifier. System 100 addressed this by partially inferring distribution of a "non-client" class by collecting images of persons independent of the client (not client specific). Although these images do not completely represent a "non-client" class (the "non-client" class includes all the persons other than the client), system 100 makes the partial inference to build the class-unspecific discriminative classifier 120. System 100 uses a Bayesian rule to design the Bayesian competitive model. In the model, the "non-client" class is represented by a union or a mixture of multiple subclasses, where when it is represented by a union of subclasses, a max rule (BCM-max) is derived; and when by a mixture of subclasses, a sum-rule (BCM-sum) is obtained. Additionally, to improve verification of unspecific person results, in one implementation, the described Bayesian competitive model is combined with generative verification. Both the Bayesian competitive model and the generative verification are adaptive to unknown new persons.

An Exemplary Procedure

Figure 8:
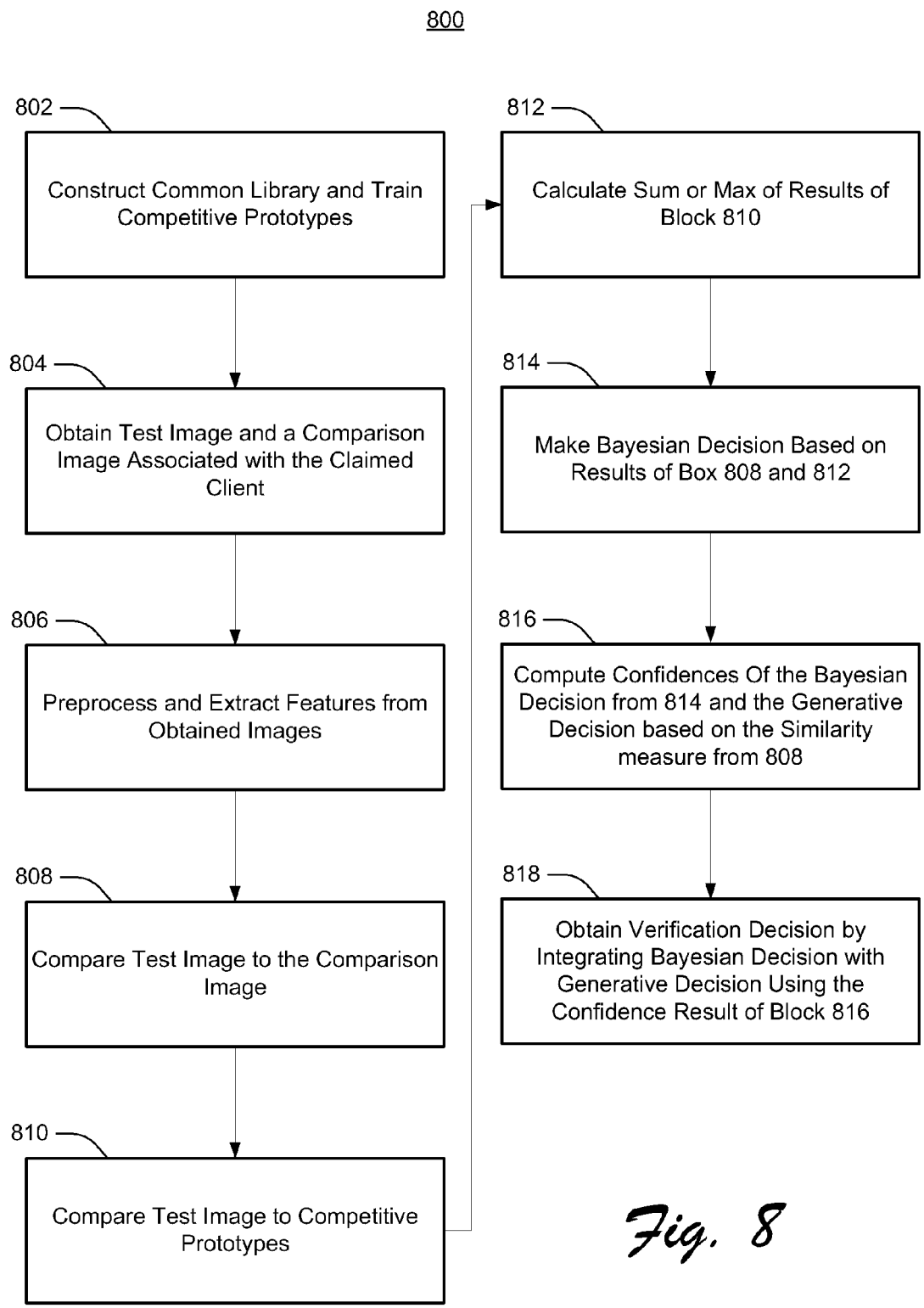
FIG. 8 shows an exemplary procedure for unspecific person verification by integrating a Bayesian competitive model with a generative verification, according to one embodiment.

FIG. 8 shows an exemplary procedure 800 for unspecific person verification by integrating a Bayesian competitive model with a generative verification, according to one embodiment For purposes of exemplary description, the operations of the procedure are described with respect to components of system 100 of FIG. 1. The leftmost numeral of a component reference number indicates the particular figure where the component is first described.

At block 802, system 100 (FIG. 1) constructs and trains competitive prototypes 118 from a common library. The operations of this block describe the distribution of the non-client class in view of an identified feature space and classifier parameters based on that feature space. In this implementation, the competitive prototypes 118 are constructed offline. At block 804, verification model 112 obtains a test image and a comparison image associated with the claimed client. At block 806, the verification module 112 preprocesses and extracts features from the test image and the comparison image. For example, in this implementation, facial regions are partitioned into components including eyes, nose, and mouth. Gabor (Holistic, or other) features are then extracted with respect to these components. The extracted features are then compressed using well-known Principal Component Analysis (PCA) techniques.

At block 808, verification module 112 compares the test image to the claimed client (comparison image)—in feature space, rather than in image space. At block 810, verification module 112 compares the test image and the competitive prototypes 118. At block 812, verification module 112 calculates the sum or max of the results of block 810. At block 814, verification module makes a Bayesian decision based on the results of blocks 808 and 812. At block 816 verification module 112 computes respective confidences of the Bayesian decision from block 814 and generative decision based on the similarity measure from block 808. In one implementation, this is accomplished by building a confidence index table off-line, and during online computations, retrieving the table to obtain confidence measures for comparison to obtain the final confidence result. At block 818, verification module 112 obtains a verification decision by integrating the Bayesian decision with the generative decision using the confidence result of block 816.

Figure 9:
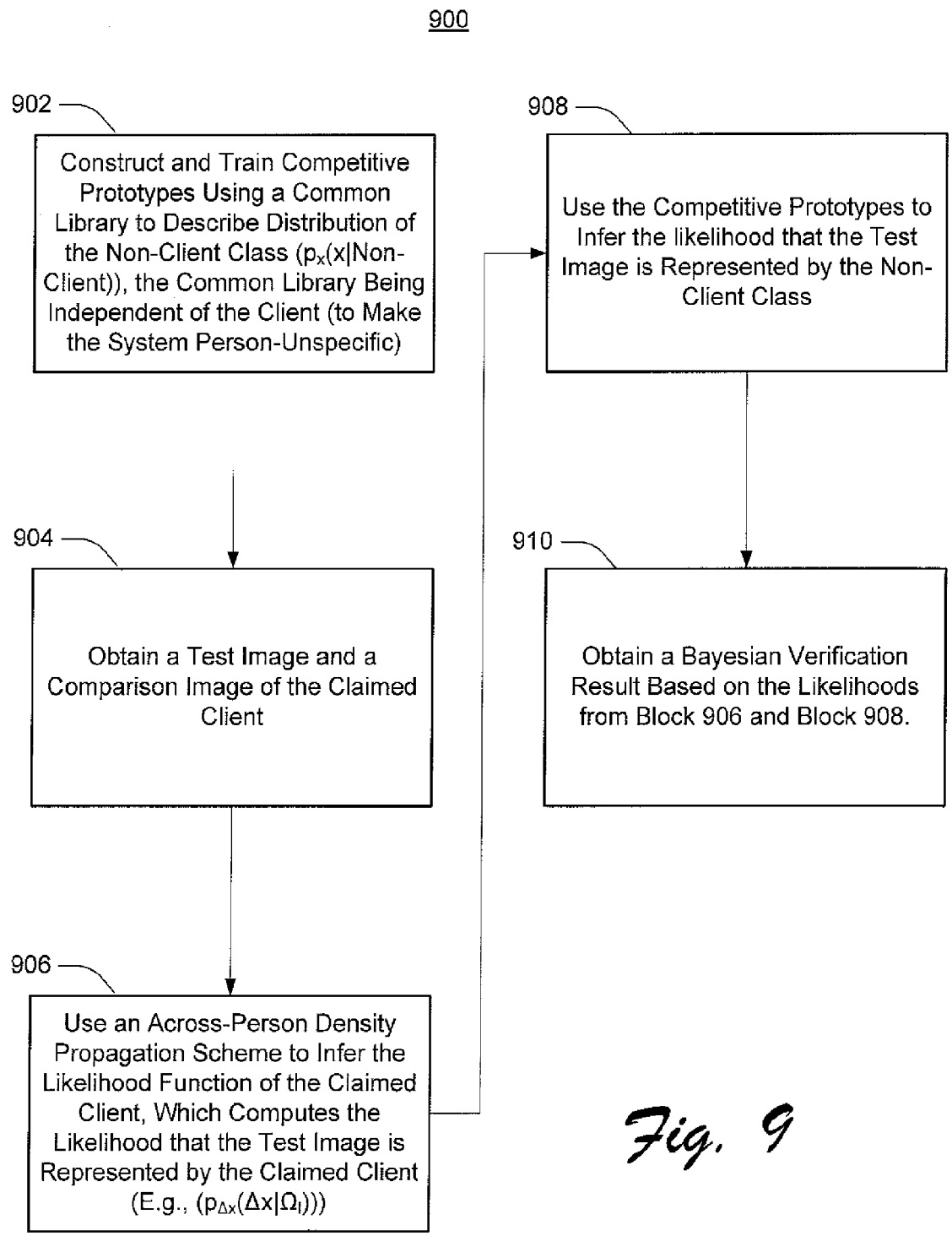
FIG. 9 shows further detailed aspects of the exemplary procedure of Bayesian competitive model, according to one embodiment.

FIG. 9 shows further detailed aspects of the exemplary procedure of Bayesian competitive model, according to one embodiment. For purposes of exemplary description, the operations of the procedure are described with respect to components of system 100 of FIG. 1. The leftmost numeral of a component reference number indicates the particular figure where the component is first described. At block 902, system 100 (FIG. 1) constructs and trains competitive prototypes 118 from a common library 116. The common library is independent of any client (unspecific person) class. The operations of this block describe the distribution of the non-client class in view of an identified feature space and classifier parameters based on that feature space. In this implementation, the competitive prototypes 118 are constructed offline. At block 904, verification model 112 obtains a test image and a comparison image associated with the claimed client. At block 906, the verification module 112 utilizes an across-person density propagation scheme to infer the likelihood function of the claimed client, which computes the likelihood that the test image is represented by the claimed client. This is accomplished by propagating distributions of numerous known persons to that of the claimed client C.

At block 908, verification module 112 calculates a likelihood that the test image is represented by the "non-client" class, using the competitive prototypes. At block 910, verification module 112 determines a Bayesian verification result based on the inferred likelihood that the test image is represented by the claimed client (block 906) and the likelihood that the test image is represented by the non-client class (block 908). Because the Bayesian verification measure is based on these two competing calculations, the Bayesian verification measure is a competitive similarity measure, which gives the Bayesian decision result (e.g., please see the Bayesian competitive verification result 120 of FIG. 1)

Conclusion

Although the systems and methods for a Bayesian competitive model and its integration with generative verification for unspecific person verification have been described in language specific to structural features and/or methodological operations or actions, it is understood that the implementations defined in the appended claims are not necessarily limited to the specific features or actions described. For example, the described systems and methods can be extended to many applications other than face verification. Such applications include, for example, applications for signature verification and speaker verification. The solution for handling the class-unspecific problem is also valuable to other open-set problems, such as rejection in pattern recognition, constant false alarm for signal detection and foreground/background layer separation for general objects. In another example, although system 100 has been shown as a stand-alone computing device, it can be appreciated that system 100 may also be a distributed computing environment with servers and client computing devices and data stored locally or remotely with respect to such devices. For example, the described unspecific person verification operations can be performed on a client computing device based on information/data stored on a server computing device. Accordingly, the specific features and operations of system 100 are disclosed as exemplary forms of implementing the claimed subject matter.

The invention claimed is:

1. A method implemented at least in part by a computer, the method comprising:

calculating a competitive measure for verification of an unspecific person, the competitive measure being from a discriminative classifier based on a Bayesian competitive model, the discriminative classifier being adaptable to unknown new classes; and integrating the Bayesian competitive model with a generative verification in view of confidence measures, of the Bayesian competitive model and the generative verification, compared with a set of confidence criteria to make a decision regarding verification of the unspecific person, wherein:

the confidence measures of the Bayesian competitive model and the generative verification are computed in view of an accuracy rate on a validation set to determine reliability of the Bayesian competitive model and the generative verification.

2. The method of claim 1, wherein the competitive measure is as follows:

$$h_\theta(x_T, C) = \frac{p_x(x_T|C)P(C)}{p_x(x_T|\overline{C})P(\overline{C})} > 1$$

wherein:

C is a claimed client, $x_T$ represents a test image, the test image having substantial guarantees of authenticity, $h_\theta(x_T,C)$ represents a decision function of whether C=T exists, where T is a true identity of $x_T$, $p_x(x_T|C)$ represents a likelihood that the test image is represented by the claimed client, $p_x(x_T|\overline{C})$ represents a likelihood that the test image is represented by a non-client class, P(C) is an a priori probability of the test image being from the claimed client $P(\overline{C})$ is an a priori probability of the test image being from the non-client class.

3. The method of claim 1, further comprising integrating the Bayesian competitive model with a generative verification to make the decision in view of an integrated classifier.

4. The method of claim 1, wherein the discriminative classifier is based on two inferred likelihoods: a likelihood that a test image is represented within a non-client class, and a likelihood that the test image is represented by a claimed client.

5. The method of claim 4, wherein the likelihood that the test image is represented by the claimed client is inferred using an across-person density propagation scheme; the scheme propagating distributions of multiple known persons to the claimed client.

6. The method of claim 4, wherein the non-client class is defined by a common library comprising images of persons with variations in one or more of pose, illumination, expression, age, size, and adornments.

7. The method of claim 1, wherein calculating is performed in view of a common library comprising multiple images of persons that are independent of a claimed client, and wherein calculating further comprises:

constructing and training competitive prototypes using the common library to describe distribution of a non-client class; and inferring likelihood that a test image is represented by a non-client class.

8. The method of claim 7, wherein constructing the competitive prototypes further comprises:

determining that the non-client class is a union of multiple sub-classes; and responsive to the determining, combining the competitive prototypes with a BCM-max rule that categorizes images in one cluster into one sub-class such that a cluster centroid representing a mean of the sub-class.

9. The method of claim 7, wherein constructing the competitive prototypes further comprises:

determining that the non-client class is a mixture of multiple sub-classes; and responsive to the determining, combining images from the non-client class using a BCM-sum rule.

10. A computer-readable medium comprising computer-program instructions executable by a processor for:

calculating a competitive measure for verification of an unspecific person, the competitive measure being from a discriminative classifier based on a Bayesian competitive model, the discriminative classifier being adaptable to unknown new classes; and integrating the Bayesian competitive model with a generative verification in view of a set of confidence criteria to make a decision regarding verification of the unspecific persons, wherein:

the competitive measure is as follows:

$$h_\theta(x_T, C) = \frac{p_x(x_T|C)P(C)}{p_x(x_T|\overline{C})P(\overline{C})} > 1$$

wherein:

C is a claimed client, $x_T$ represents a test image, the test image having substantial guarantees of authenticity, $h_\theta(x_T,C)$ represents a decision function of whether C=T exists, where T is a true identity of $x_T$, $p_x(x_T|C)$ represents a likelihood that the test image is represented by the claimed client, $p_x(x_T|\overline{C})$ represents a likelihood that the test image is resented by a non-client class, P(C) is an a priori probability of the test image being from the claimed client $P(\overline{C})$ is an a priori probability of the test image being from the non-client class.

11. The computer-readable medium of claim 10, wherein confidences of two classifiers are computed in view of an accuracy rate on a validation set to determine reliability of the two classifiers.

12. The computer-readable medium of claim 10, further comprising computer-program instructions for integrating the Bayesian competitive model with a generative verification to make the decision in view of an integrated classifier.

13. The computer-readable medium of claim 10, wherein the discriminative classifier is based on two inferred likelihoods: a likelihood that a test image is represented within a non-client class, and a likelihood that the test image is represented by a claimed client.

14. The computer-readable medium of claim 13, wherein the likelihood that the test image is represented by the claimed client is inferred using an across-person density propagation scheme; the scheme propagating distributions of multiple known persons to the claimed client.

15. The computer-readable medium of claim 10, wherein the computer-program instructions for calculating are performed in view of a common library comprising multiple images of persons that are independent of a claimed client, and wherein calculating further comprises:
  constructing and training competitive prototypes using the common library to describe distribution of a non-client class; and
  inferring likelihood that a test image is represented by a non-client class.

16. A computing device comprising:
the processor; and
a memory couple to the processor, the memory comprising computer-program instructions executable by the processor for:
  calculating a competitive measure for verification of an unspecific person, the competitive measure being from a discriminative classifier based on a Bayesian competitive model, the discriminative classifier being adaptable to unknown new classes; and
  integrating the Bayesian competitive model with a generative verification in view of a set of confidence criteria to make a decision regarding verification of the unspecific person,
wherein:
the competitive measure is as follows:

$$h_\theta(x_T, C) = \frac{p_x(x_T|C)P(C)}{p_x(x_T|\overline{C})P(\overline{C})} > 1$$

wherein:
  C is a claimed client,
  $x_T$ represents a test image, the test image having substantial guarantees of authenticity,
  $h_\theta(x_T,C)$ represents a decision function of whether C=T exists, where T is a true identity of $x_T$,
  $p_x(x_T|C)$ represents a likelihood that the test image is represented by the claimed client,
  $p_x(x_T|\overline{C})$ represents a likelihood that the test image is represented by a non-client class,
  $P(C)$ is an a priori probability of the test image being from the claimed client
  $P(\overline{C})$ is an a priori probability of the test image being from the non-client class.

17. The computing device of claim 16 wherein the computer-program instructions further comprise instructions for integrating the Bayesian competitive model with a generative verification to make the decision in view of an integrated classifier.

* * * * *